United States Patent
Dougherty

(10) Patent No.: US 6,392,348 B1
(45) Date of Patent: May 21, 2002

(54) DUAL VOLTAGE ALTERNATOR USING CENTER-TAP REGULATION

(75) Inventor: Thomas J. Dougherty, Waukesha, WI (US)

(73) Assignee: Johnson Controls Technology Co., Plymouth, MI (US)

( * ) Notice: Subject to any disclaimer, the term of this patent is extended or adjusted under 35 U.S.C. 154(b) by 0 days.

(21) Appl. No.: 09/715,492

(22) Filed: Nov. 17, 2000

(51) Int. Cl.[7] .................................................. H02J 7/14
(52) U.S. Cl. .............................. 315/82; 322/28; 322/90
(58) Field of Search ............................... 315/77, 80, 82, 315/137, 147; 322/24–28, 89–95

(56) References Cited

U.S. PATENT DOCUMENTS

| | | | |
|---|---|---|---|
| 4,153,869 A | 5/1979 | Ragaly | 322/90 |
| 4,816,736 A | 3/1989 | Dougherty et al. | 320/17 |
| 4,963,813 A | * 10/1990 | Bolle | 322/17 |
| 5,164,655 A | 11/1992 | Heavey | 322/8 |
| 5,355,071 A | 10/1994 | Ishida et al. | 320/6 |
| 5,418,401 A | * 5/1995 | Kaneyuki | 322/90 |
| 5,661,368 A | 8/1997 | Deol et al. | 315/82 |
| 5,719,486 A | * 2/1998 | Taniguchi et al. | 322/28 |
| 6,100,745 A | 8/2000 | Dougherty | 327/512 |

* cited by examiner

Primary Examiner—Don Wong
Assistant Examiner—Wilson Lee
(74) Attorney, Agent, or Firm—Foley & Lardner

(57) ABSTRACT

A vehicle electrical system for supplying a first load with a first direct current voltage and for supplying a second load with a second direct current voltage lower than the first direct current voltage is disclosed. The vehicle electrical system includes: a multiphase alternating current generator having star-connected armature windings with respective phase winding terminations and a common center connection point wherein the generator generates a first higher alternating current voltage output at the respective phase winding terminations and a second lower alternating current voltage output at the common center connection point; a first rectifier unit electrically connected between the respective phase winding terminations and a first energy storage device and a first load for full-wave rectifying the first alternating current voltage output to be supplied to the first energy storage device and the first load; a second rectifier unit electrically connected in a circuit path between the common center connection point and a second energy storage device and a second load for rectifying the second alternating current voltage output to be supplied to the second energy storage device and the second load; and a controller electrically connected to the second rectifier unit, the second energy storage device and the common center connection point, the controller being operable to sense a voltage output level of the second alternating current voltage output and to selectively enable and disable the second rectifier unit to allow or block current flow through the circuit path between the common center connection point and the second energy storage device and the second load in response to the sensed voltage output level.

28 Claims, 2 Drawing Sheets

DUAL VOLTAGE ALTERNATOR USING CENTER-TAP REGULATION

BACKGROUND OF THE INVENTION

1. Field of the Invention

This invention relates to a vehicle electrical system that can provide a higher voltage from an alternator to a first group of power consumers in the vehicle and that can simultaneously provide a lower voltage from the alternator to a second group of power consumers in the vehicle.

2. Description of the Related Art

Traditionally, the electrical loads of an automobile—such as lighting systems, radio players, windshield wipers, horns, etc.—receive electrical power from an on-board electrical storage device such as a 12 volt (nominal) battery. The 12 volt battery is charged by an alternator operating at about 14 volts, and the voltage from the alternator and/or 12 volt battery is used as a standard electrical power input for the varied types of electrical loads placed on the automobile, including continuous loads, prolonged loads, and intermittent loads.

In recent years, the 12 volt vehicle battery and the 14 volt alternator have been called upon to supply increasingly greater electrical power to more and more electrical loads. Moreover, this demand will, no doubt, continue as new power consumers are continually added to vehicles. For example, electrically pre-heated catalytic converters, electrically power-assisted steering, and seat and windshield heaters are now commonplace, as are other power consumers. Hence, there is significant interest in replacing the 12 volt vehicle battery with a battery having a higher voltage, such a 36 volt (nominal) battery, which is coupled to an alternator having a charging voltage of about 42 volts.

While higher voltage batteries and alternators do provide increased electrical power, many traditional electrical components cannot handle increased voltages without overheating, burning out, or both. For instance, traditional headlights and tail lights would rapidly burn out if powered by a 36 volt battery and/or a 42 volt alternator; in other words, these electrical components would essentially become a fuse for such an electrical system. Therefore, in order to avoid the expense of redesigning many traditional electrical components to handle the increased voltages in a vehicle using a 42 volt alternator, a means for supplying a lower voltage from the 42 volt alternator is needed.

An alternator that is presently widely used for the charging of the battery in vehicles is a three phase alternator. The windings in the alternator are wound as a three phase Y-winding (also called star winding). The output of the alternator is rectified through a full wave rectifier to change the alternating current to direct current. A typical three-phase full-wave rectifier consists of paired uni-directional conducting devices, normally solid state diodes, connected in series. The diodes conduct in a single direction and by appropriate interconnection of the windings and the paired diodes, current flow is established from the three phase winding to a positive output line, through the battery and/or loads and a through return line connected to the opposite side of the three-phase windings.

Theoretically, the current flow in the Y-winding of the alternator should be so balanced and arranged that there is a zero potential and current available at the common center connection point (also called the neutral point) of the Y-connected windings. However in practice, a voltage potential develops at the common point. Typically, the common point provides an average voltage that is about one half of the full-wave rectified output voltage of the alternator. This voltage has been used and connected into prior art electrical systems for the operating of auxiliary loads, such as indicating lamps and the like. (See, for example, the dual voltage alternators of U.S. Pat. Nos. 4,816,736, 5,661,368, and 5,719,486.) Accordingly, it can be appreciated that these patents suggest one means for tapping a second lower voltage from an alternator in order to power electrical components having a lower voltage capacity.

However, if the alternators described in U.S. Pat. Nos. 4,816,736, 5,661,368 and 5,719,486 were to be reconfigured to output 42 volts as proposed above, these alternators would present problems in a typical vehicle electrical system. Specifically, the common point of a 42 volt Y-winding alternator would provide an average voltage of about 21 volts. This 21 volt average output would be above the voltage capacity of many traditional electrical components in a vehicle. Therefore, the alternators described in U.S. Pat. Nos. 4,816,736, 5,661,368 and 5,719,486 may not be suitable for use as a 42 volt alternator in a vehicle having traditional electrical components as the neutral point 21 volt average output of these alternators may damage the electrical components.

What is needed, therefore, is a vehicle electrical system that can provide a higher voltage (such as 42 volts) from an alternator to a first group of power consumers in a vehicle and that can simultaneously provide a lower voltage from the alternator to a second group of power consumers (such as traditional vehicle electrical components) that cannot tolerate higher voltages.

SUMMARY OF THE INVENTION

The foregoing needs are met by a vehicle electrical system for supplying a first load with a first direct current voltage and for supplying a second load with a second direct current voltage lower than the first direct current voltage. The vehicle electrical system includes a multiphase alternating current generator for generating a first alternating current voltage output and a second alternating current voltage output, a first rectifier unit for rectifying the first alternating current voltage output to be supplied to a first energy storage device and the first load, a second rectifier unit for rectifying the second alternating current voltage output to be supplied to a second energy storage device and the second load, and a controller electrically connected to the second rectifier unit for selectively enabling and disabling the second rectifier unit to allow or block current flow from the generator and to the second energy storage device and the second load.

The multiphase alternating current generator has star-connected armature windings with respective phase winding terminations and a common center connection point. The generator generates the first alternating current voltage output at the respective phase winding terminations and the second alternating current voltage output at the common center connection point wherein the average voltage of the first alternating current voltage output is greater than the average voltage of the second alternating current voltage output. The first rectifier unit is electrically connected between the respective phase winding terminations and the first energy storage device and the first load for full-wave rectifying the first alternating current voltage output to be supplied to the first energy storage device and the first load. The second rectifier unit is electrically connected in a circuit path between the common center connection point and the second energy storage device and the second load for rectifying the second alternating current voltage output to be supplied to the second energy storage device and the second load. The controller is electrically connected to the second rectifier unit, the second energy storage device and the common center connection point, and is operable to sense a voltage output level of the second alternating current voltage output and to selectively enable and disable the second rectifier unit to allow or block current flow through the circuit path between the common center connection point and the second energy storage device and the second load in response to the sensed voltage output level.

It is therefore an advantage of the present invention to provide a vehicle electrical system that can provide a higher voltage from an alternator to a first group of power consumers in the vehicle and that can simultaneously provide a lower voltage from the alternator to a second group of power consumers in the vehicle.

It is another advantage of the present invention to provide a vehicle electrical system that can provide a higher voltage (such as 42 volts) from an alternator to power consumers in a vehicle and that can simultaneously provide a lower voltage from the alternator to a second group of power consumers such as traditional vehicle electrical components that cannot tolerate higher voltages.

It is still another advantage of the present invention to provide a vehicle electrical system that can use and control a higher voltage obtained from the phase terminations of the star-connected armature windings of a multi-phase generator and that can use and control a lower voltage obtained from a common center connection point of the star-connected armature windings of the multiphase generator.

BRIEF DESCRIPTION OF THE DRAWINGS

These and other features, aspects, and advantages of the present invention will become better understood upon consideration of the following detailed description, appended claims and accompanying drawings in which:

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE INVENTION

Figure 1:
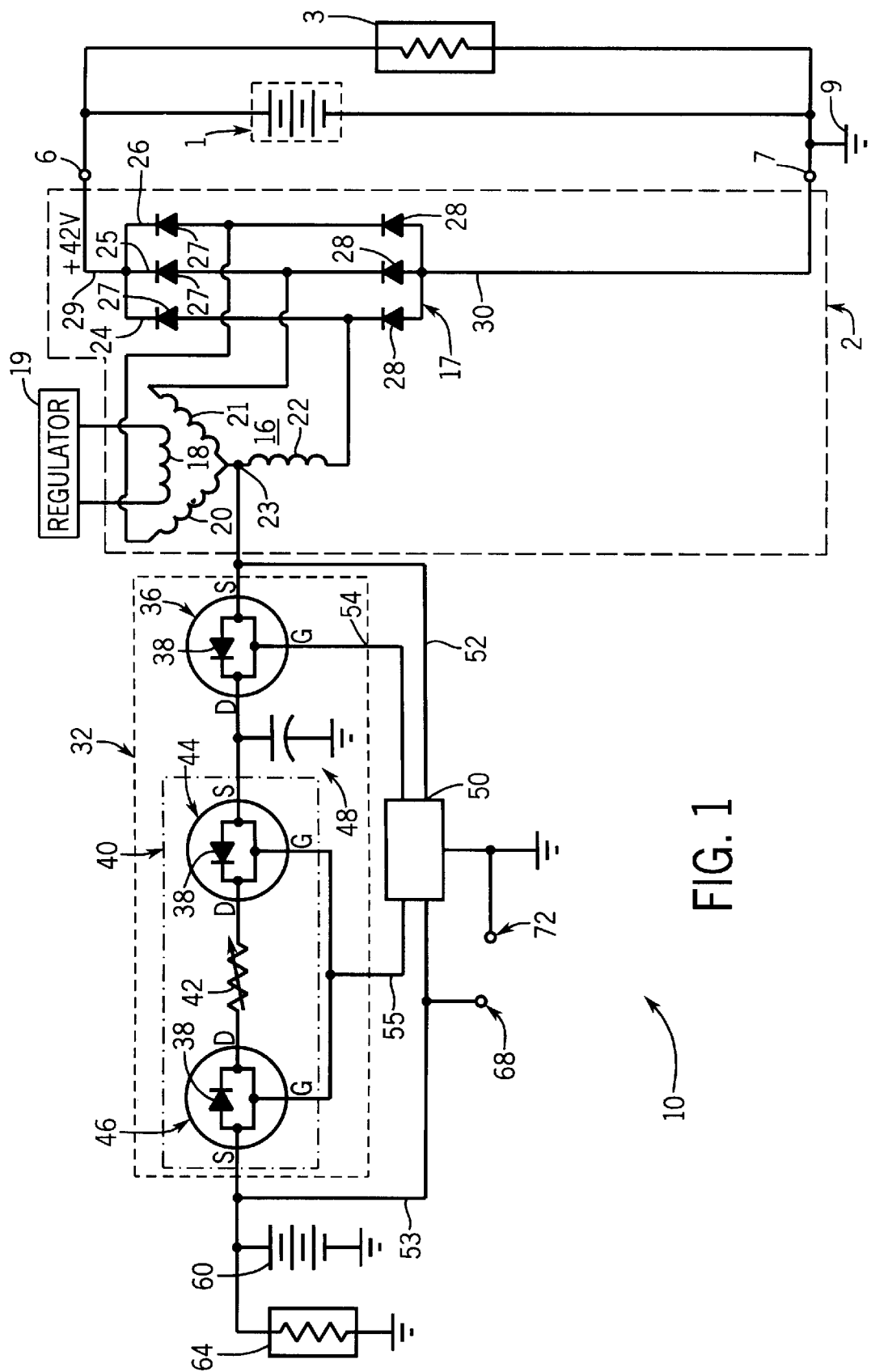
FIG. 1 is a schematic circuit diagram of an alternator driven battery charging and load system for a vehicle in accordance with the present invention.

Looking at FIG. 1, an embodiment of a vehicle electrical system 10 is schematically illustrated and includes a first battery 1 for stand-by load operation and an alternator unit 2 for maintaining of the first battery 1 fully charged and for directly providing power to a first load 3 during operation of the vehicle and the internal combustion engine (not shown). In the illustrated embodiment of the invention, the first battery 1 provides a 36 volt nominal output between 36 volt terminals 6 and 7 defining a first and second high voltage terminal for operating of the first load 3. The one 36 volt terminal 7 is connected as a common ground line to the vehicle chassis as shown at 9. The first battery 1 may consist of a multiple cell rechargeable lead-acid battery as is well known. The first load 3 is connected across the 36 volt terminals 6 and 7 for direct energization. The first load 3 may include one or more individual loads, connected in parallel to the 36 volt terminals 6 and 7. For example, the 36 volt first load 3 may include the starter, window defrosters and such other equipment appropriately operated at 36 volts.

The first battery 1 in accordance with conventional practice is operative to supply current and voltage during standby operation, such as when the engine is not operating and the alternator unit 2 therefore is not providing any power, or at low idle speed when the output of the alternator unit 2 may be insufficient to provide the necessary power for operating of the total load system. The alternator unit 2 generates an output voltage of 42 volts and is coupled to and driven by the engine. The alternator unit 2 has its output connected to charge the 36 volt first battery 1 to maintain the charge on the first battery 1. The rectified output of the alternator unit 2 also directly drives the 36 volt first load 3 during normal vehicle operation. The alternator unit 2 includes an alternating current generator 16 and a full wave bridge first rectifier unit 17 connected to supply direct current power for charging of the first battery 1 and operating of the first load 3. The generator 16 produces the necessary full load current for the first load 3 of the vehicle.

The generator 16 is preferably a three-phase generator with a self-limiting current construction. The output of the generator increases with the speed. However, as the speed increases, the electrical reactance characteristic of the generator windings is such that the current level is limited to a maximum output. The voltage output is also dependent on the speed and the energization level of an exciter field winding 18. A voltage regulator 19 is connected across the output of the winding 18 and energizes winding 18 to limit and maintain an appropriate nominal 42 volt supply to the first battery 1 and to the first load 3.

The illustrated three phase generator 16 is a Y-connected or star-connected generator having three separate phase windings 20, 21 and 22, which are wound within a suitable magnetic core, not shown, in physically circumferentially spaced relation such that the peak current and voltage generated in each of the windings is separated from that in the other winding by 120 electrical degrees. The output of each winding 20, 21 and 22 is an alternating current sine wave in accordance with conventional and well-known alternator operation. The three windings 20–22 are electrically connected in a known star-connection or Y-connection in which one corresponding end of such winding is connected to a common center connection point 23 while the opposite end is individually connected via first rectifier unit 17 to the vehicle electrical system including the first battery 1 and the first load 3 to supply direct current to the first battery 1 and the first load 3. The voltage generated by each winding is controlled by the energizing of the separate field winding 18. The field winding 18 is connected to the output of the three phase winding or the first battery 1 for energization under the control of the voltage regulator unit 19. Any suitable voltage regulator such as those presently used in the control of alternator systems can be employed to provide an appropriate 42 volt output from the alternator unit 2 for charging of the first battery 1 and energizing of the first load 3.

The first rectifier unit 17 includes three similar branches 24, 25, and 26, each of which similarly includes a pair of series diodes 27 and 28. The several branches 24–26 are connected in parallel between direct current alternator output leads 29 and 30, which are connected to the output terminals 6 and 7 of the first battery 1. The phase windings 20–22 are respectively connected to the common center connection of the diodes 27–28 in the three branches 24–26 to complete the known connection of the first rectifier unit 17. The output of the first rectifier unit 17 is a direct current voltage and current with the output lead 29 at a positive voltage relative to the output lead 30. The positive lead 29 is also connected to the positive battery terminal 6 to establish proper power supply connection for charging of the first battery 1 and for energizing of the first load 3 directly from the alternator unit 2.

The voltage of the common center connection point 23 has frequencies three times the frequencies of each of the phase windings 20, 21, 22 and an average voltage of about one-half (21 volts) of the average output voltage (42 volts) at the alternator unit output leads 29 and 30. In the version of the invention shown in FIG. 1, the common center connection point 23 is connected to a second battery 60 which provides power to a second load 64, which may include one or more individual loads connected in parallel to the second battery 60. Typically, the second battery 60 has a 12 volt nominal output. In the circuit path between the common center connection point 23 and the second battery 60 and the second load 64, there is located a second rectifier unit 32 that rectifies the alternating current output voltage of the common center connection point 23 for supplying a direct current voltage and current to the second battery 60 and the second load 64.

In FIG. 1, the second rectifier unit 32 includes a first switchable device 36, which is preferably a transistor such as a MOSFET, a second switchable device 40, and an energy storage device 48, preferably a capacitor, located between the first switchable device 36 and the second switchable device 40. The second switchable device 40 is a device providing switching and overload protection service, and may be the device described in U.S. Pat. No. 6,100,745, which is incorporated herein by reference. The second switchable device 40 includes a first MOSFET 44 having a parasitic diode 38, a source junction S, a drain junction D, and a gate junction G, and a second MOSFET 46 having a parasitic diode 38, a source junction S, a drain junction D and a gate junction G. The drain junction D of the first MOSFET 44 and the drain junction D of the second MOSFET 46 are connected to a positive temperature coefficient resistor 42. By connecting the drain junction D of the first MOSFET 44 and the drain junction D of the second MOSFET 46, the parasitic diodes 38 of the first MOSFET 44 and the second MOSFET 46 are arranged such that discharge of the second battery 64 to the capacitor 48 or the first battery 1 is prevented when the first MOSFET 44 and the second MOSFET 46 are not conducting (i.e., not turned "on").

The second rectifier unit 32 is electrically connected to a controller 50, which may be selected from controllers known in the art. The controller 50 is electrically connected to the gate junctions G of MOSFETs 44 and 46 by way of line 55 and is electrically connected to the gate junction G of MOSFET 36 by way of line 54. The controller 50 is operable to sense the alternating current output voltage of the common center connection point 23 by way of line 52, and can sense the voltage at the second battery 60 by way of line 53. The controller 50 includes a logic circuit which controls operation of the second rectifier unit 32 as will be described below.

The vehicle electrical system 10 also includes a positive battery jumping connection 68 and a negative battery jumping connection 72, which may be posts suitable for connection to jump start cables commonly used to jump start a vehicle. The jumping connections 68 and 72 allow for connection of the second battery 60 to a battery charger or additional battery for charging or jump starting.

Figure 2:
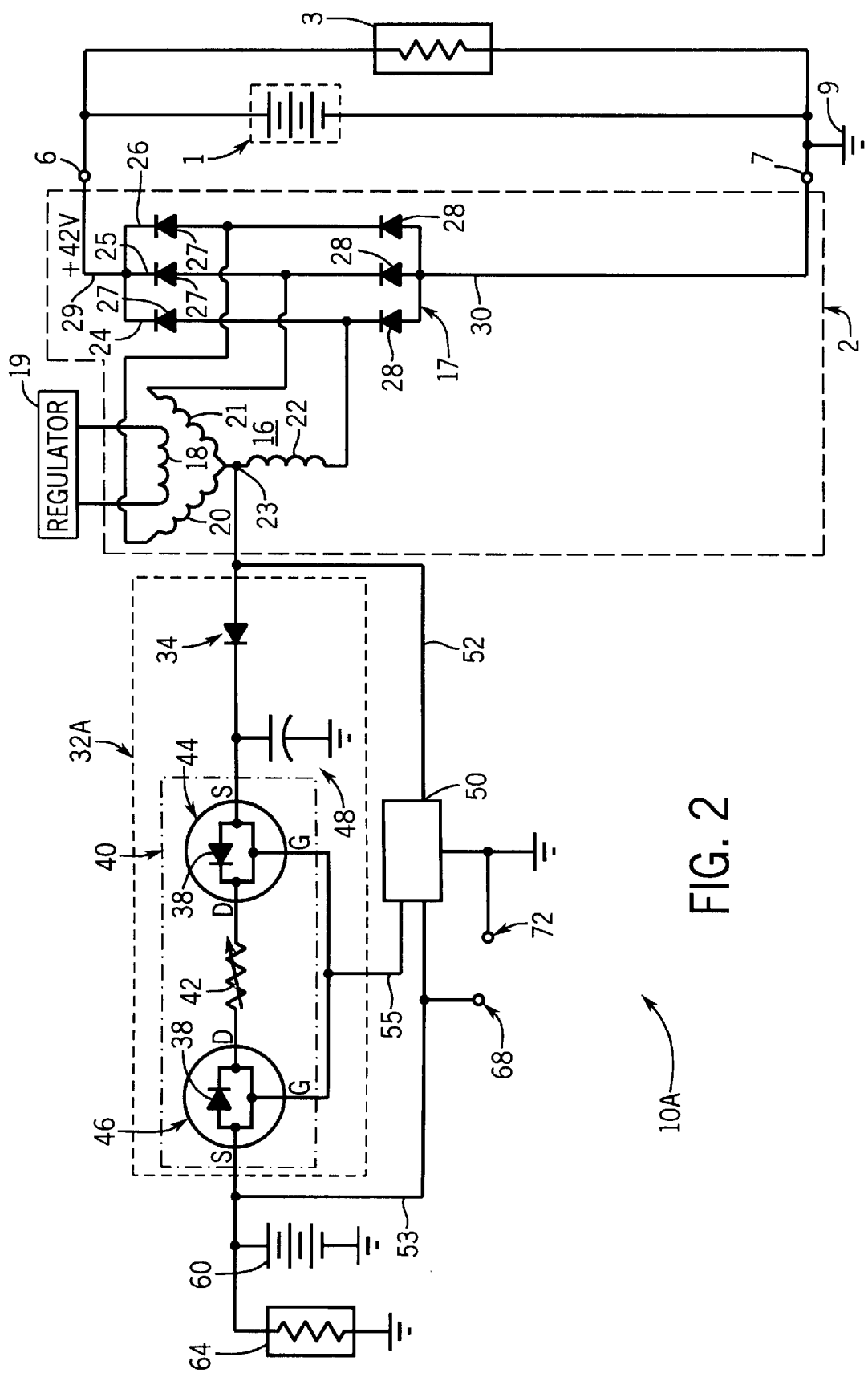
FIG. 2 is a schematic circuit diagram of another alternator driven battery charging and load system for a vehicle in accordance with the present invention.

In FIG. 2, there is shown an alternative embodiment of a vehicle electrical system 10A in which the first switchable device 36 of the second rectifier unit 32 of the vehicle electrical system 10 of FIG. 1 has been replaced with a diode 34 having its anode connected to the common center connection point 23 and its cathode connected to the source junction S of the MOSFET 44.

Having described the construction of the vehicle electrical system 10 in FIG. 1, the operation of the vehicle electrical system 10 can now be described. Upon starting, a vehicle engine (not shown) drives the generator 16 as is well known in the art, thereby generating a first alternating current voltage output at the respective phase winding terminations 20, 21, 22 and a second alternating current voltage output at the common center connection point 23. As detailed above, the output of the common center connection point 23 has frequencies three times the frequencies of each of the phase windings 20, 21, 22 and an average voltage of about one-half (e.g., 21 volts) of the output voltage (e.g., 42 volts) at the alternator unit output leads 29 and 30. The output of the first rectifier unit 17, which is connected to the phase winding terminations 20, 21, 22 is a direct current voltage and current with the output lead 29 at a positive voltage relative to the output lead 30. The positive lead 29 is connected to the positive battery terminal 6 to establish proper power supply connection for charging of the first battery 1 and for energizing of the first load 3 directly from the alternator unit 2.

The second alternating current voltage output at the common center connection point 23 is rectified by the second rectifier unit 32 and supplied as direct current voltage and current to the second battery 60 and the second load 64 as follows. Looking first at FIG. 1, it can be seen that the second rectifier unit 32 is electrically connected in a circuit path between the common center connection point 23 and the second battery 60 and the second load 64. As detailed above, the first switchable device 36 of the second rectifier unit 32 preferably comprises a MOSFET, and the second switchable device 40 of the second rectifier unit 32 includes a first MOSFET 44 and a second MOSFET 46. Each of these MOSFETs 36, 44, 46 has two basic operating states. In a first normal ("off") operating state, current flow is blocked between the source junction S and the drain junction D. In a second ("on") operating state, a conducting channel is formed between the drain junction D and the source junction S when a voltage is applied to the gate junction G.

In response to various sensed generator operating conditions, the controller 50 will provide a first control signal (i.e., a voltage) to the gate junction G of the first switchable device 36 and a second control signal (i.e., a voltage) to the gate junctions G of the first MOSFET 44 and the second MOSFET 46 to turn on the MOSFETs 36, 44, 46 and provide a conductive path between the common center connection point 23 and the second battery 60 and the second load 64. For instance, when the generator 16 is operating, the controller 50 senses the second alternating current voltage output at the common center connection point 23 of the generator 16 by way of sensing line 52. Depending on the sensed second alternating current voltage output, the logic circuit in the controller 50 will provide different first control signals to the gate junction G of the first switchable device 36 and different second control signals to the gate junctions G of the first MOSFET 44 and the second MOSFET 46 of the second switchable device 40.

In one operating condition of the generator 16, the second alternating current voltage output at the common center connection point 23 of the generator 16 will be positive with respect to vehicle ground as is well known. When the logic circuit in the controller 50 senses that the second alternating current voltage output at the common center connection point 23 of the generator 16 is positive with respect to vehicle ground, the controller 50 will continuously provide a first control signal to the gate junction G of the first switchable device 36 to provide a conductive path through the first switchable device 36. When the logic circuit in the controller 50 senses that the second alternating current voltage output at the common center connection point 23 of the generator 16 is negative with respect to vehicle ground, the controller 50 will stop providing the first control signal to the gate junction G of the first switchable device 36 thereby blocking current flow from the source junction S to the drain junction D of the first switchable device 36. In this manner, a direct current voltage is in effect supplied at the drain junction D of the first switchable device 36. In a further embodiment of this control scheme, the controller 50 can continuously provide a first control signal to the gate junction G of the first switchable device 36 when the second alternating current voltage output at the common center connection point 23 of the generator 16 is positive with respect to vehicle ground and is less than or equal to a threshold voltage. For example, the controller 50 may only provide a first continuous control signal to the gate junction G of the first switchable device 36 when the second alternating current voltage output at the common center connection point 23 of the generator 16 is above 0 and less than or equal to 14 volts (i.e., the threshold voltage) with respect to vehicle ground.

When the first switchable device 36 is conducting (i.e., a first control signal is provided by the controller 50 to the gate junction G of the first switchable device 36), the logic circuit in the controller 50 may provide a second control signal to the gate junctions G of the first MOSFET 44 and the second MOSFET 46 of the second switchable device 40 in order to apply direct current voltage to the second battery 60 and the second load 64. Various direct current voltage control schemes may be implemented into the logic circuit in the controller 50. In one example embodiment, when the logic circuit in the controller 50 senses that the second alternating current voltage output at the common center connection point 23 of the generator 16 is positive with respect to vehicle ground and is less than or equal to a threshold voltage, a second control signal may be continuously provided to the gate junctions G of the first MOSFET 44 and the second MOSFET 46 of the second switchable device 40 in order to apply direct current voltage to the second battery 60 and the second load 64. For example, the controller 50 may continuously provide a second control signal to the gate junctions G of the first MOSFET 44 and the second MOSFET 46 of the second switchable device 40 when the second alternating current voltage output at the common center connection point 23 of the generator 16 is above 0 and less than or equal to 14 volts (i.e., the threshold voltage) with respect to vehicle ground.

When the logic circuit in the controller 50 senses that the second alternating current voltage output at the common center connection point 23 of the generator 16 is positive with respect to vehicle ground and is greater than the threshold voltage, the controller 50 can intermittently provide a second control signal to the gate junctions G of the first MOSFET 44 and the second MOSFET 46 of the second switchable device 40 in order to intermittently apply direct current voltage to the second battery 60 and the second load 64. In this control scheme, the controller 50 uses pulse-duration modulation (also called pulse-width modulation) from a pulse width modulator to provide an intermittent second control signal to the gate junctions G of the first MOSFET 44 and the second MOSFET 46 of the second switchable device 40. The pulse width modulator can vary the duration (i.e. the time period between the start time of the second control signal pulse and the stop time) of the second control signal pulse. For instance, when the controller 50 senses that the second alternating current voltage output at the common center connection point 23 of the generator 16 is positive with respect to vehicle ground and is at a first voltage level above the threshold voltage, a second control signal pulse having a first duration is provided by the controller 50 to the gate junctions G of the first MOSFET 44 and the second MOSFET 46 of the second switchable device 40. When the controller subsequently senses that the second alternating current voltage output at the common center connection point 23 of the generator 16 is positive with respect to vehicle ground and is at a second voltage level above the first voltage level, a second control signal pulse having a second shorter duration is provided by the controller 50 to the gate junctions G of the first MOSFET 44 and the second MOSFET 46 of the second switchable device 40. It can be understood that in this control scheme, the duration of the second control signal pulse provided by the controller 50 to the gate junctions G of the first MOSFET 44 and the second MOSFET 46 of the second switchable device 40 decreases when the sensed second alternating current voltage output at the common center connection point 23 of the generator 16 increases above the threshold voltage.

Accordingly, the operation of the logic circuit of the controller 50 may proceed as follows. In a first operating condition, the second alternating current voltage output is positive with respect to ground and increasing toward a threshold voltage. In this first operating condition, the controller 50 continuously provides a first control signal to the gate junction G of the first switchable device 36 so that the first switchable device 36 conducts, and the controller 50 provides a continuous second control signal to the gate junctions G of the first MOSFET 44 and the second MOSFET 46 of the second switchable device 40 so that the second switchable device 40 conducts and supplies direct current voltage to the second battery 60 and the second load 64. In a second operating condition, the second alternating current voltage output is positive with respect to ground, greater than the threshold voltage, and increasing toward a peak voltage output for the common center connection point 23 of the generator 16. In this second operating condition, the controller 50 continuously provides a first control signal to the gate junction G of the first switchable device 36 so that the first switchable device 36 conducts, and the controller 50 provides pulsed second control signals to the gate junctions G of the first MOSFET 44 and the second MOSFET 46 of the second switchable device 40 wherein the duration of the second control signal pulse is greatest just above the threshold voltage and the duration of the pulses decreases until the peak voltage output for the common center connection point 23 of the generator 16 is reached. In a third operating condition, the second alternating current voltage output is positive with respect to ground, greater than the threshold voltage, and decreasing toward the threshold voltage. In this third operating condition, the controller 50 continuously provides a first control signal to the gate junction G of the first switchable device 36 so that the first switchable device 36 conducts, and the controller 50 provides pulsed second control signals to the gate junctions G of the first MOSFET 44 and the second MOSFET 46 of the second switchable device 40 wherein the duration of the second control signal pulse is shortest just below the peak voltage output for the common center connection point 23 of the generator 16 and the duration of the pulses decreases until the threshold voltage is reached. In a fourth operating condition, the second alternating current voltage output is positive with respect to ground, at or below the threshold voltage and decreasing toward vehicle ground. In this fourth operating condition, the controller 50 continuously provides a first control signal to the gate junction G of the first switchable device 36 so that the first switchable device 36 conducts, and the controller 50 provides a continuous second control signal to the gate junctions G of the first MOSFET 44 and the second MOSFET 46 of the second switchable device 40 so that the second switchable device 40 conducts and supplies direct current voltage to the second battery 60 and the second load 64. In a fifth operating condition, the second alternating current voltage output is negative with respect to ground. In this fifth operating condition, the controller 50 does not provide the first control signal to the gate junction G of the first switchable device 36 and therefore, the first switchable device 36 does not conduct. However, in this fifth operating condition, the controller 50 can provide a continuous or intermittent second control signal to the gate junctions G of the first MOSFET 44 and the second MOSFET 46 of the second switchable device 40 so that the second switchable device 40 conducts and supplies direct current voltage from the energy storage device 48 (e.g., capacitor) to the second battery 60 and the second load 64.

Because the second alternating current voltage output at the common center connection point 23 of the generator 16 is continuously changing, the pulse width modulator of the controller 50 and each of these MOSFETs 36, 44, 46 are selected to allow for fast switching. The controller 50 must be able continuously sense the second alternating current voltage output at the common center connection point 23 of the generator 16 and provide continuous or pulsed control signals in response to the sensed second alternating current voltage output at the common center connection point 23 of the generator 16. It can be appreciated that the use of the pulsed control signals when the sensed second alternating current voltage output is above a threshold voltage serves to lower the average direct current voltage applied to the second battery 60 and the second load 64. Specifically, only a portion of the available voltage above the threshold voltage is applied to the second battery 60 and the second load 64 as the first MOSFET 44 and the second MOSFET 46 of the second switchable device 40 are only intermittently turned "on" when the sensed second alternating current voltage output is above the threshold voltage. Furthermore, when the sensed second alternating current voltage output is at its highest levels, the first MOSFET 44 and the second MOSFET 46 of the second switchable device 40 are turned "on" for the shortest duration. In addition, the logic circuit of the controller 50 may also adjust the threshold voltage and the duration of the pulse based on the sensed voltage at the second battery 60 (by way of line 53).

Therefore, by limiting the time periods for which the second alternating current voltage output at the common center connection point 23 of the generator 16 is applied to the second battery 60 and the second load 64, the average voltage applied to the second battery 60 and the second load 64 is less than the average second alternating current voltage output at the common center connection point 23 of the generator 16, and far less than the average first output voltage at the alternator unit output leads 29 and 30. In this manner, the alternator unit 2 can provide a higher voltage (such as 42 volts) to the first load 3 of the vehicle electrical system 10 of FIG. 1 and can simultaneously provide to the second load 64 a lower average voltage that is tolerated by the second load 64, which may comprise traditional electrical components presently used in vehicles.

The operation of the vehicle electrical system 10A in FIG. 2, is very similar to the operation of the vehicle electrical system 10 described above. However, because the first switchable device 36 of the second rectifier unit 32 of the vehicle electrical system 10 of FIG. 1 has been replaced with a diode 34 having its anode connected to the common center connection point 23 and its cathode connected to the source junction S of the MOSFET 44, there is no need for the controller 50 to provide control signals to a first switchable device. The diode 34 will conduct at all times when the second alternating current voltage output is positive with respect to ground, and will not conduct when the second alternating current voltage output is negative with respect to ground. Operation of the first MOSFET 44 and the second MOSFET 46 of the second switchable device 40 in the five operating conditions described above will be the same for the vehicle electrical system 10A in FIG. 2. Therefore, the alternator unit 2 can provide a higher voltage (such as 42 volts) to the first load 3 of the vehicle electrical system 10A of FIG. 2 and can simultaneously provide a lower average voltage to the second load 64 as in the vehicle electrical system of FIG. 1.

Thus, the present invention provides a vehicle electrical system that can provide a higher voltage from an alternator to a first group of power consumers in the vehicle and that can simultaneously provide a lower voltage from the alternator to a second group of power consumers in the vehicle. In addition, the present invention provides a vehicle electrical system that can provide a higher voltage (such as 42 volts) from an alternator to power consumers in a vehicle and that can simultaneously provide a lower voltage from the alternator to a second group of power consumers such as traditional vehicle electrical components that cannot tolerate higher voltages.

Although the present invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A vehicle electrical system for supplying a first load with a first direct current voltage and for supplying a second load with a second direct current voltage lower than the first direct current voltage, the vehicle electrical system comprising:

a multiphase alternating current generator having star-connected armature windings, the armature windings having respective phase winding terminations and a common center connection point, the generator generating a first alternating current voltage output at the respective phase winding terminations and a second alternating current voltage output at the common center connection point, the average voltage of the first alternating current voltage output being greater than the average voltage of the second alternating current voltage output;

a first rectifier unit, electrically connected between the respective phase winding terminations and a first energy storage device and a first load, for full-wave rectifying the first alternating current voltage output to be supplied to the first energy storage device and the first load; and a second rectifier unit, electrically connected in a circuit path between the common center connection point and a second energy storage device and a second load, for rectifying the second alternating current voltage output to be supplied to the second energy storage device and the second load; and a controller electrically connected to the second rectifier unit, the second energy storage device and the common center connection point, wherein the controller is operable to sense a voltage output level of the second alternating current voltage output and to selectively enable and disable the second rectifier unit to allow or block current flow through the circuit path between the common center connection point and the second energy storage device and the second load in response to the sensed voltage output level.

2. The vehicle electrical system of claim 1 wherein:

the second rectifier unit includes a switchable device electrically connected to the controller, the switchable device including a first normal operating state in which current flow is blocked in a direction from the common center connection point to the second energy storage device and the second load, and the switchable device including a second operating state in which current flow is allowed in the direction from the common center connection point to the second energy storage device and the second load, and the controller provides a control signal to switch the switchable device into the second operating state in response to the sensed voltage output level.

3. The vehicle electrical system of claim 2 wherein the switchable device comprises a transistor.

4. The vehicle electrical system of claim 3 wherein the switchable device comprises a MOSFET.

5. The vehicle electrical system of claim 2 wherein:

the controller continuously provides the control signal to keep the switchable device in the second operating state when the sensed voltage output level is positive with respect to vehicle ground.

6. The vehicle electrical system of claim 5 wherein:

the controller continuously provides the control signal to keep the switchable device in the second operating state when the sensed voltage output level is less than or equal to a threshold voltage.

7. The vehicle electrical system of claim 2 wherein:

the second rectifier unit further includes a second switchable device arranged in the circuit path between the switchable device and the second energy storage device and the second load, the second switchable device including a first normal operating state in which current flow is blocked in either direction between the switchable device and the second energy storage device and the second load, and the second switchable device including a second operating state in which current flow is allowed between the switchable device and the second energy storage device and the second load, and the controller provides a second control signal to switch the second switchable device into the second operating state in response to the sensed voltage output level.

8. The vehicle electrical system of claim 7 wherein:

the second switchable device comprises a pair of MOSFETs, the drains of the MOSFETs being electrically connected, and the gates of the MOSFETs being connected to the controller.

9. The vehicle electrical system of claim 8 wherein:

the second switchable device further comprises a positive temperature coefficient resistor electrically connected between the drains of the MOSFETs.

10. The vehicle electrical system of claim 7 wherein:

the controller continuously provides the control signal to keep the switchable device in the second operating state when the sensed voltage output level is positive with respect to vehicle ground, and the controller continuously provides the second control signal to the second switchable device to keep the second switchable device in the second operating state when the sensed voltage output level is less than or equal to a threshold voltage, and the controller intermittently provides the second control signal to the second switchable device to switch the second switchable device into and out of the second operating state when the sensed voltage output level is greater than the threshold voltage.

11. The vehicle electrical system of claim 7 wherein:

the controller continuously provides the control signal to keep the switchable device in the second operating state when the sensed voltage output level is positive with respect to vehicle ground, and the controller continuously provides the second control signal to the second switchable device to keep the second switchable device in the second operating state when the sensed voltage output level is less than or equal to a threshold voltage.

12. The vehicle electrical system of claim 11 wherein:

the controller continuously provides the second control signal to the second switchable device for a time period having a duration dependent on the sensed voltage output level when the sensed voltage output level is greater than the threshold voltage.

13. The vehicle electrical system of claim 12 wherein:

the duration of the time period decreases when the sensed voltage output level increases.

14. The vehicle electrical system of claim 12 wherein:

the controller includes a pulse width modulator for outputting the second control signal.

15. The vehicle electrical system of claim 7 wherein:

the second rectifier unit further includes a third energy storage device in the circuit path between the switchable device and the second switchable device.

16. The vehicle electrical system of claim 15 wherein:

the first energy storage device comprises a first battery, the second energy storage device comprises a second battery, and the third energy storage device comprises a capacitor.

17. The vehicle electrical system of claim 16 further comprising:

a positive battery jumping connection and a negative battery jumping connection electrically connected to the second battery.

18. The vehicle electrical system of claim 1 wherein:

the second rectifier unit includes a diode having an anode electrically connected to the common center connection point and a cathode electrically connected to a switchable device, the switchable device including a first normal operating state in which current flow is blocked in either direction between the diode and the second energy storage device and the second load, and the switchable device including a second operating state in which current flow is allowed between the diode and the second energy storage device and the second load, and the controller provides a control signal to switch the switchable device into the second operating state in response to the sensed voltage output level.

19. The vehicle electrical system of claim 18 wherein:

the switchable device comprises a pair of MOSFETs, the drains of the MOSFETs being electrically connected, and the gates of the MOSFETs being connected to the controller.

20. The vehicle electrical system of claim 19 wherein:

the switchable device further comprises a positive temperature coefficient resistor electrically connected between the drains of the MOSFETs.

21. The vehicle electrical system of claim 18 wherein:

the controller continuously provides the control signal to the switchable device to keep the switchable device in the second operating state when the sensed voltage output level is less than or equal to a threshold voltage.

22. The vehicle electrical system of claim 21 wherein:

the controller intermittently provides the control signal to the switchable device to switch the switchable device into and out of the second operating state when the sensed voltage output level is greater than the threshold voltage.

23. The vehicle electrical system of claim 21 wherein:

the controller continuously provides the control signal to the switchable device for a time period having a duration dependent on the sensed voltage output level when the sensed voltage output level is greater than the threshold voltage.

24. The vehicle electrical system of claim 23 wherein:

the duration of the time period decreases when the sensed voltage output level increases.

25. The vehicle electrical system of claim 18 wherein:

the controller includes a pulse width modulator for outputting the control signal.

26. The vehicle electrical system of claim 18 wherein:

the second rectifier unit further includes a third energy storage device in the circuit path between the diode and the switchable device.

27. The vehicle electrical system of claim 26 wherein:

the first energy storage device comprises a first battery, the second energy storage device comprises a second battery, and the third energy storage device comprises a capacitor.

28. The vehicle electrical system of claim 27 further comprising:

a positive battery jumping connection and a negative battery jumping connection electrically connected to the second battery.

* * * * *